Figure 1:
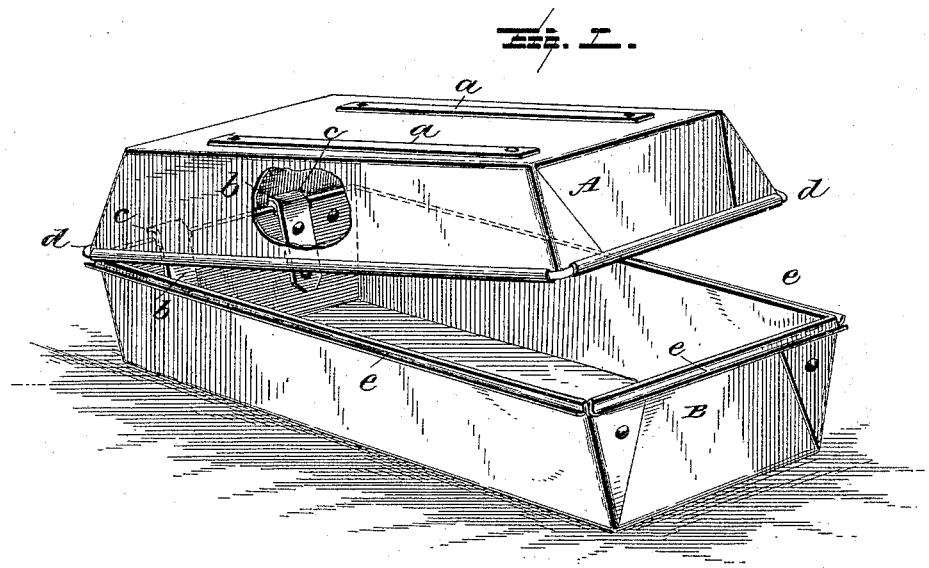

(No Model.)

A. J. IDEN.
BAKE PAN.

No. 445,996. Patented Feb. 10, 1891.

Witnesses
L. C. Hill
Chas. E. Graham

Inventor
Andrew J. Iden.
per
Chas. H. Fowler,
Attorney

UNITED STATES PATENT OFFICE.

ANDREW J. IDEN, OF MILWAUKEE, WISCONSIN.

BAKE-PAN.

SPECIFICATION forming part of Letters Patent No. 445,996, dated February 10, 1891.

Application filed July 14, 1890. Serial No. 358,627. (No model.)

*To all whom it may concern:*

Be it known that I, ANDREW J. IDEN, a citizen of the United States, residing at Milwaukee, in the county of Milwaukee and State of Wisconsin, have invented certain new and useful Improvements in Bake-Pans; and I do hereby declare that the following is a full, clear, and exact description of the same, reference being had to the annexed drawings, making a part of this specification, and to the letters of reference marked thereon.

This invention relates to certain new and useful improvements in bake-pans of that class wherein two pans are so arranged and constructed relatively to each other that they may be used either as a single covered or as a double open pan.

Heretofore it has been the practice to make pans of this class with the surrounding edge of the lower pan bent into an L-shaped flange, which is adapted to incase the edge of the upper part or pan, and thus prevent the escape of the gases generated in baking. This form of flange has proved to be unsuitable for the purpose for which it is designed, for the reason, first, that it is not of sufficient strength to sustain the weight of the upper pan or part, and when the pan is used for heavy roasts the pan will be so sprung that a tight seal or joint will not be formed at the junction of the two parts or pans. The two parts or pans have also been permanently hinged together, so that while allowing of their being used as a double open pan will not permit of their separation for use, for instance, in a small oven where there is not sufficient room for them to lie side by side. They have also been hinged at the side, thus leaving a large portion of the surrounding edge without a seal.

The immediate object of the present invention is to obviate these difficulties and objections. I form the surrounding edge of the one part or pan with a yielding substantially V-shaped trough, the walls of the same being integral with the body of the pan, there being a double wall at the junction of the body and trough, and into this trough the beaded edge of the other pan is designed to fit, so as to form a tight joint or seal, there being a double seal, as it were, for the reason that the beaded edge of the one pan having a bearing upon diametrically-opposite sides in the trough, one of which is bound at all times to remain in close contact, and thus more effectually prevent the escape of the gases. I connect the two parts or pans by a simple separable hinge or hinges, so that the two parts may be employed separately when desired, and I hinge them at one end, so as to secure the greatest amount of seal around the edges.

Other objects and advantages of the invention will hereinafter appear, and the novel features thereof will be specifically defined by the appended claim.

The invention is clearly illustrated in the accompanying drawings, which, with the letters of reference marked thereon, form a part of this specification, in which—

Figure 2:
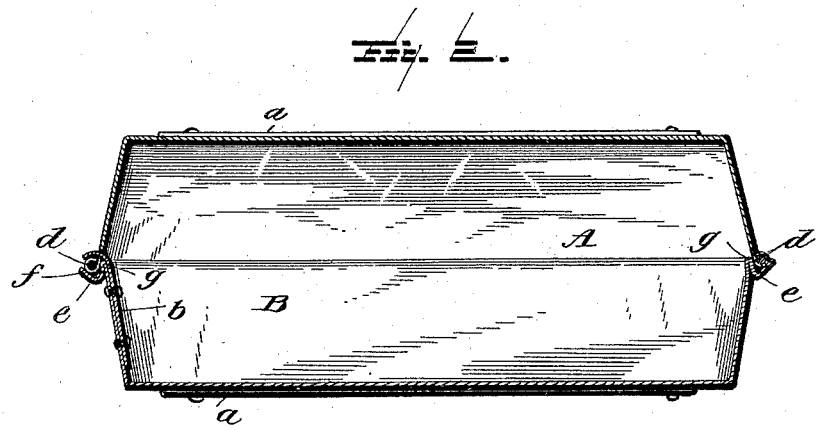
Figure 3:
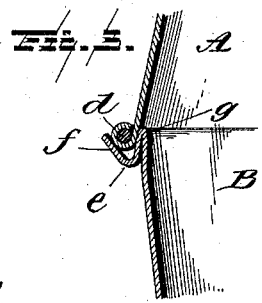

Figure 1 is a perspective view of my improved pan with one part slightly raised and a portion broken away to better disclose the construction of the hinge. Fig. 2 is a longitudinal vertical section through the same with the parts closed and sealed. Fig. 3 is an enlarged detail section showing the form of the seal.

Like letters of reference indicate like parts throughout the several views.

Referring now to the details of the drawings by letter, A designates one pan and B the other. I preferably provide the bottom of each with a strip or cleat or cleats $a$, which serve to elevate the bottom of the pans from the oven-bottom, as seen in Fig. 2. The two pans are hinged together at one end, preferably by the means shown in Figs. 1 and 2, wherein $b$ are strips secured to the inner wall of one end of one pan with their free ends extended beyond the top of the pan and curved outward beyond the plane of the said end, as seen best in Fig. 2. The adjacent corresponding edge of the end of the other pan is provided with openings $c$, through which the curved ends of the said strips pass and engage the wire $d$ of said pan, as seen in Fig. 2. The strips should be a rather snug fit for the openings, so as to to make as tight a joint as possible without preventing turning of the parts as a hinge. This will allow the pans to be turned end to end to be used as two open pans and still permit of their being separated when desired. The one pan B is provided around its upper edge with a trough $e$ to receive the wire or beaded edge of the other pan, as seen in Figs. 2 and 3, and this trough is formed as shown best in Fig. 3, wherein it will be seen that the walls of the pan are turned over at their upper edge and extended downward substantially parallel with the walls of the body of the pan, and then bent upward and outward from the said main walls to form the trough, as shown in Fig. 3. When the pans are closed, the wire or beaded edge of the other pan is seated in this trough and has a bearing upon diametrically-opposite sides, as at $f$ and $g$, in the trough, so as to form a double seal, and even if the pan or pans should be distorted from extreme weight the one edge or the other would be sure to have a bearing in the trough, and thus form a seal to prevent the escape of the gases. This form of flange also serves to strengthen the upper edge of the pan. The pans may be used with either one uppermost, as preferred. This trough extends upon all four sides of the pan, and even the hinged end is sealed, as seen in Fig. 2.

What I claim as new is—

The combination, with a pan having at its upper edge a substantially V-shaped trough upon all its sides, the said trough having its inner wall substantially parallel with the main wall of the pan and integral therewith, of a pan hinged thereto at one end and having its edge provided with a bead adapted to fit within the said trough and bear thereupon at diametrically-opposite points, substantially as shown and described.

In testimony that I claim the above I have hereunto subscribed my name in the presence of two witnesses.

ANDREW J. IDEN.

Witnesses:
AUG. F. ZENTNER,
ALBERT G. KRANTHORFE.